United States Patent
Hayashida et al.

(10) Patent No.: US 7,484,400 B2
(45) Date of Patent: Feb. 3, 2009

(54) METHOD OF TESTING OPTICAL INFORMATION MEDIUM

(75) Inventors: Naoki Hayashida, Tokyo (JP); Tatsuya Kato, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 490 days.

(21) Appl. No.: 10/547,787

(22) PCT Filed: Mar. 4, 2004

(86) PCT No.: PCT/JP2004/002726

§ 371 (c)(1),
(2), (4) Date: Sep. 6, 2005

(87) PCT Pub. No.: WO2004/079733

PCT Pub. Date: Sep. 16, 2004

(65) Prior Publication Data

US 2006/0182925 A1    Aug. 17, 2006

(30) Foreign Application Priority Data

Mar. 7, 2003   (JP)   ............................. 2003-060886

(51) Int. Cl.
  *G01N 3/56*   (2006.01)
  *B32B 3/02*   (2006.01)
(52) U.S. Cl. ........................... 73/7; 428/64.1; 428/64.4
(58) Field of Classification Search .................. 73/7; 428/64.4, 68.1
  See application file for complete search history.

(56) References Cited

U.S. PATENT DOCUMENTS 6,576,320 B2 * 6/2003 Hayashida et al. ......... 428/64.1

6,630,562 B2 * 10/2003 Ogawa et al. ............... 528/196
6,973,014 B1 * 12/2005 Ihde ........................ 369/30.21

FOREIGN PATENT DOCUMENTS

JP      09-100111      4/1997
JP      2002-260280    9/2002

* cited by examiner

*Primary Examiner*—Hezron Williams
*Assistant Examiner*—Mark Shabman
(74) *Attorney, Agent, or Firm*—Oblon, Spivak, McClelland, Maier & Neustadt, P.C.

(57) ABSTRACT

A testing method capable of quantifying abrasion resistance on the translucent base surface of a high-recording-density optical information medium simply and in a form of reflecting an actual application environment, and judging criteria appropriate for the testing method. When an evaluation test in terms of abrasion resistance on a laser beam incident-side surface is conducted on an optical information medium to and/or from which recording and/or reproducing is made by a laser beam shone into an information recording layer from a translucent base side, and which has the focused radius R, of a recording/reproducing laser beam on the translucent base surface, of 40-400 μm, defined by the following expression (1) $R = 2T \tan[\sin^{-1}(NA/n)]$ (1) (in the expression, T is the thickness (μm) of the translucent base, NA numerical aperture of an object lens in the recording/reproducing device, and n refractive index of the translucent base), the abrasion resistance on a laser beam incident-side surface is evaluated based on the error amount of a reproduction signal after a laser beam incident-side surface is abraded by an abrasion wheel specified in ISO9352.

9 Claims, 2 Drawing Sheets

METHOD OF TESTING OPTICAL INFORMATION MEDIUM

TECHNICAL FIELD

The present invention relates to a testing method capable of quantifying abrasion resistance on the translucent base side surface of a high-recording-density optical information medium simply and in a form of reflecting an actual application environment.

BACKGROUND ART

In recent years, optical information media typified by CDs and DVDs have been widely used as recording media to record large-volume digital data. In general, in a reproduction-only optical information medium, a translucent base, a reflection layer, and a protective layer are laminated sequentially in that order from a light-incident surface side, and in a writable optical information medium, a translucent base, a recording layer, a reflection layer, and a protective layer are laminated sequentially in that order from a light-incident surface side.

The reflection layer serves as an information recording layer in the reproduction-only optical information medium, and the recording layer serves as the information recording layer in the writable optical information medium. When data is read in either of these types of optical information medium, a reproducing laser beam is applied from the translucent base side, and the reflected light thereof is detected. When data is written into the writable optical recording medium, a recording laser beam is applied from the translucent base side, and the chemical state or the physical state of the recording layer is changed by the thermal energy and/or the light energy of the laser beam based on the data to be recorded.

Here, the laser beam applied to the optical information medium is focused with an optical system in such a way that a beam spot having a predetermined radius is formed on the reflection layer or the recording layer. Consequently, if there is a flaw on the surface of the translucent base, the beam spot is not formed properly, and a read error and a write error may occur. A method in which a high-hardness hard coat layer is disposed on the surface of the translucent base has been previously known as a method for preventing occurrence of such a flaw.

In recent years, attempts have been made to increase the numerical aperture (NA) of an object lens used for focusing the recording/reproducing laser beam to on the order of 0.85, and reduce the wavelength $\lambda$ of the recording/reproducing laser beam to on the order of 400 nm, so as to make the focused spot radius small and, thereby, record large-volume digital data. As a result, recently, a next-generation optical disc format has been made public under the designation of Blu-ray Disc.

Such an increase in NA causes reduction in allowance for warp and inclination, that is, tilt margin, of the optical information medium. Therefore, in order to ensure an adequate tilt margin, the thickness of the translucent base must be decreased. For example, when NA is set at on the order of 0.85 and $\lambda$ is set at on the order of 400 nm, it is required to decrease the thickness of the translucent base to on the order of 100 μm in order to ensure the adequate tilt margin.

Furthermore, the increase in NA causes reduction in working distance between an object lens and the surface of the optical recording medium. For example, when NA is set at on the order of 0.85, the working distance is decreased to on the order of 100 μm significantly smaller than ever.

However, when the working distance is significantly decreased, there is a very high possibility that the surface of the optical information medium and the object lens or a support supporting the object lens are brought into contact with each other during the rotation of the optical information medium. If such a contact occurs during the rotation of the optical information medium, a fatal flaw may occur on the translucent base surface of the optical information medium. The occurrence of a flaw resulting from such contact can be prevented to some extent by disposing the above-described hard coat layer. However, in the case where the thickness of the translucent base is decreased to on the order of 100 μm, the focused radius of the recording/reproducing laser beam on the translucent base surface is also decreased significantly. Therefore, even a flaw of the size not causing a read error or a write error in known optical information media, e.g., CDs and DVDs, readily cause a read error or a write error. Consequently, a hard coat exhibiting performance higher than ever is required.

The focused radius R of the recording/reproducing laser beam on the translucent base surface is ideally represented by the following expression (1):

$$R = 2T \tan[\sin^{-1}(NA/n)] \quad (1)$$

(in the expression, T is the thickness (μm) of the translucent base of the optical information medium, NA is the numerical aperture of the object lens in the recording/reproducing device of the optical information medium, and n is the refractive index of the translucent base of the optical information medium).

Therefore, as for a DVD in which NA=0.60 and T=0.6 mm, when n is assumed to be on the order of 1.58, R becomes on the order of 500 μm. On the other hand, as for a system in which NA=0.85 and T=100 μm, R becomes on the order of 130 μm, and the focused spot radius on the translucent base surface becomes significantly small.

Such a significant decrease in focused spot radius on the translucent base surface refers to that the sensitivity to not only a flaw resulting from the contact with the object lens, but also a flaw resulting from handling by the user is extremely enhanced. From this point of view as well, the performance of the hard coat must be significantly improved than ever.

With respect to optical information media, such as a Blu-ray Disc, having a focused spot radius on the translucent base surface significantly smaller than that of a known optical information medium, the abrasion resistance on the translucent base surface must be evaluated by some way in the case where an appropriate hard coat material is selected in the process of development, or in the case where quality control is performed in the process of production. However, under present circumstances, there is no appropriate means therefore other than the method for evaluating an optical information medium described in Japanese Unexamined Patent Application Publication No. 2002-260280 which was applied for a patent by the applicant of the present invention and was laid open.

In general, when the abrasion resistance on paint coatings and resin materials are evaluated, in many cases, sample surfaces are abraded by predetermined abrasion devices, and the amounts of abrasion of test pieces resulting therefrom are quantified by using the amounts of change of various parameters, e.g., mass, thickness, and light transmittance of the test piece. As for optically translucent materials, such as a hard coat layer material of the optical information medium, having relatively high surface hardnesses, it is most appropriate to quantify by using the amount of change in light transmittance or light diffusion. One of the reasons therefore is that the amount of abrasion is not large to the extent capable of being indicated by the amount of change in mass or thickness of the test piece. Specifically, it is generally performed that white parallel light is allowed to incident on the above-described test piece and the haze value thereof is measured.

However, since the evaluation method based on the measurement of the above-described haze value is a method in which transmitted light of the translucent test piece is measured, the method cannot be applied directly to the translucent base surface of the optical information medium.

Another problem occurs in that the determination of appropriate judging criteria of abrasion resistance is difficult in itself with respect to the translucent base surface of the high-recording-density optical information medium, e.g., a Blu-ray Disc. As for optical information media, e.g., CDs and DVDs, which have been already commercialized and become widespread, there are track records of usage by many users. Therefore, the judging criteria of the level of abrasion resistance on the surface of the translucent base required for preventing occurrence of any problem in the daily use can be determined based on those track records. However, as for the significantly high-recording-density optical information media, e.g., a Blu-ray Disc, that is, optical information media in need of high-performance hard coat layer materials, there is no track record of usage by the user. Consequently, it takes some period of time until an adequate track record of usage is established. Therefore, the judging criteria of the level of abrasion resistance required for preventing occurrence of any problem in practice cannot be determined based on the actual track records of usage by users.

Accordingly, it is an object of the present invention to provide a testing method capable of quantifying abrasion resistance on a translucent base surface of a high-recording-density optical information medium simply and in a form of reflecting an actual application environment, and to provide judging criteria appropriate for the testing method.

DISCLOSURE OF INVENTION

The inventors of the present invention conducted intensive research to overcome the above-described problems. As a result, it was found out that there was a good correlation between the extent of abrasion of a high-recording-density optical information medium in which the surface was abraded by a predetermined method and the error amount of a reproduction signal after abrasion, so that the present invention has been completed.

A method of testing an optical information medium according to the present invention is a method of conducting an evaluation test in terms of abrasion resistance on a laser beam incident-side surface of the optical information medium which includes at least a support base, an information recording layer, and a translucent base in that order, to and/or from which recording and/or reproducing is made optically by a laser beam incident on the above-described information recording layer from the above-described translucent base side, and which has the focused radius R of a recording/reproducing laser beam of 40 μm or more and 400 μm or less on the above-described translucent base surface, the focused radius R defined by the following expression (1):

$$R = 2T \tan[\sin^{-1}(NA/n)] \quad (1)$$

(in the expression, T is the thickness (μm) of the translucent base of the optical information medium, NA is the numerical aperture of an object lens in the recording/reproducing device of the optical information medium, and n is the refractive index of the translucent base of the optical information medium), the method characterized by comprising the step of evaluating the abrasion resistance on the laser beam incident-side surface based on the error amount of a reproduction signal after the above-described laser beam incident-side surface is abraded by abrasion wheels specified in ISO9352.

BEST MODE FOR CARRYING OUT THE INVENTION

Figure 1:
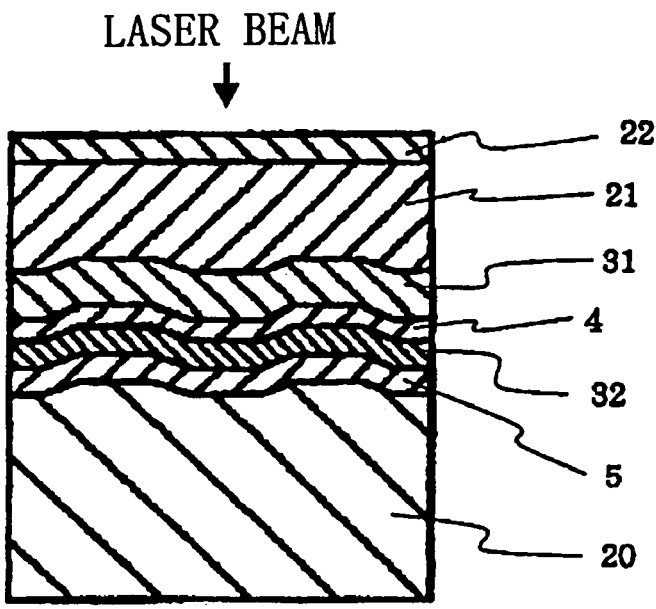
FIG. 1 is a partial sectional view showing an example of configuration of a high-recording-density optical information medium according to the present invention.

The embodiments of the present invention will be specifically described below.

In the present invention, a laser beam incident-side surface of a targeted optical information medium is abraded by abrasive wheels specified in ISO9352. This abrasive device can effect abrasion with a high degree of reproducibility.

Here, the testing method for abrasion resistance by abrasive wheels specified in ISO9352 is a testing method generally referred to as a Taber abrasion test. In this method, a tester is used in which two grinding wheels referred to as abrasive wheels are disposed at predetermined positions on a turntable, and a sample is placed on this turntable. Subsequently, a predetermined load is applied to the wheels, and the turntable is rotated by a motor. At this time, the abrasive wheels are configured to grind the sample surface while keeping a constant inclination relative to the rotation direction of the turntable.

Several types of abrasive wheels, which are different in materials and grain sizes, are prepared. The abrasion resistance on the optical information medium subjected to the test can be made clear by appropriately selecting the type of the abrasive wheel, the load applied during abrading, the number of revolutions of the turntable, and the like. In the present specification, the number of abrasion by abrasive wheels and the number of revolutions of the turntable are in the same sense.

Preferably, the type of the abrasive wheel to be used is any one of elastic abrasive wheels CS-10, CS-10F, and CF-17, and more preferably, CS-10F is used. Preferably, the turntable is rotated to effect abrasion with a load of 2.5 N or more and 4.9 N or less. More preferably, the turntable is rotated to effect abrasion with a load of 2.5 N. In this manner, the abrasion speed can be reduced, the number of revolutions of the turntable can be increased, and the test accuracy can be increased. The abrasion speed can be further reduced when suction through an abrasion powder suction nozzle is not performed.

In the testing method of the present invention, the optical information medium having been abraded as described above is evaluated directly with an optical disk driving device.

The inventors of the present invention ascertained that in the testing method of the present invention, the error amount of a reproduction signal to be measured exhibited a high correlation with flaws on the translucent base surface of the optical information medium. When this error amount is small, for example, recorded moving images and the like can be reproduced without occurrence of any problem. In the case where a bit error rate (bER) is used as an index of the error amount, the threshold value of a general optical information medium is specified to be on the order of $1 \times 10^{-4}$ regardless of the type thereof. Therefore, in the testing method of the present invention, the abrasion resistance on the laser beam incident-side surface of the optical information medium can be evaluated by measuring the number of abrasion by abrasive wheels until the bER reaches this threshold value. Specific examples of usable indices of the error amount include a bite error rate (BER) and an error amount index measured in accordance with the method for measuring an error specified in the specification of each optical information medium in addition to the bER.

Each of the above-described judging criteria is based on the following grounds.

In the testing method of the present invention, the optical information medium to be tested is primarily assumed to be a high-recording-density optical information medium in which the wavelength λ of the recording/reproducing laser beam of 600 nm or less and the numerical aperture NA of an object lens of 0.7 or more, that is, an optical information medium having the focused radius R of 40 μm or more and 400 μm or less, the R represented by the above-described expression (1). Such an optical information medium has not been commercialized as of now, and even if it is commercialized in the near future, a considerable period of time will be needed to widespread in the market. Therefore, the specification of the level of abrasion resistance on the translucent base surface of the optical information medium itself to be tested, the abrasion resistance required to prevent occurrence of any problem in practice, cannot be determined based on the track records of usage of the optical information medium.

Therefore, in the testing method of the present invention, the judging criteria thereof are determined based on the optical information medium having been already widespread in the market. In the present invention, a digital versatile disk (DVD) is used as the reference.

DVDs include reproduction-only DVD-ROM, write once (recording is possible only once) DVD-R and DVD+R, and rewritable (recording is possible repeatedly) DVD-RW, DVD+RW, and DVD-RAM. All these optical disks include polycarbonate substrates formed by injection molding as translucent bases. In many cases, hard coat layers are disposed on the surfaces of the above-described polycarbonate substrates in the rewritable DVD-RW, DVD+RW, and DVD-RAM. In general, acrylic ultraviolet curing resins are used as the materials for the hard coat layers. On the other hand, in the reproduction-only DVD-ROM and the write once DVD-R and DVD+R, no hard coat layer is disposed in principle, and the polycarbonate substrate is exposed at the translucent base surface.

These are not stored in cartridges, and are used in the condition as they are (hereafter referred to as bare disk) with the exceptions of a part of DVD-RAM and the like. That is, it can be considered that users recognize bare disks of all optical information media belong to the above-described DVD format as disks having no problem in practice regardless of whether a hard coat layer is disposed on the translucent base surface thereof or not.

The evaluation method of the present invention is applied to a high-recording-density optical information medium in which at least a support base, an information recording layer, and a translucent base, and a laser beam is incident on the information recording layer from the above-described translucent base side, so that recording and/or reproducing is made optically. Specific examples of configurations of the above-described optical information medium include a configuration shown in FIG. 1. In the optical information medium shown in FIG. 1, a reflection layer 5, a second dielectric layer 32, a recording layer 4 serving as an information recording layer, a first dielectric layer 31, a translucent base 21, and a hard coat layer 22 are disposed in that order on one surface of a support base 20. The translucent base 21 is a resin layer formed by affixing a resin sheet or applying an ultraviolet curing resin. The laser beam for recording and/or reproducing is incident on the recording layer 4 through the translucent base 21. The medium having the structure shown in FIG. 1 is suitable for high-density recording since the translucent base 21 can be made thin and, thereby, the medium can be compatible with an increase in NA of an object lens of a recording/reproducing optical system. In the structure shown in FIG. 1, preferably, the total thickness of the translucent base 21 and the hard coat layer 22 is 50 to 300 μm, more preferably is 80 to 120 μm. If this thickness is too small, an optical influence of dust attached to the laser-beam incident-side surface of the medium is increased. On the other hand, if this thickness is too large, an allowance for inclination (tilt margin) of the disk surface relative to the recording/reproducing laser beam cannot be ensured.

The optical information medium shown in FIG. 1 includes an ultraviolet curing resin film, in which inorganic fine particles are dispersed, as the hard coat layer 22 on the laser beam incident side of the translucent base 21. Consequently, the hardness is adequately high, and excellent wear resistance and abrasion resistance are exhibit. In an optical disk system which has a high NA and to which the medium shown in FIG. 1 is applied, since the translucent base 21 is thin, an influence of the presence of flaws on the surface of the translucent base 21 is increased. Therefore, the ultraviolet curing resin film, in which inorganic fine particles are dispersed, is particularly suitable for such an optical information medium.

Preferably, the thickness of the ultraviolet-cured resin film, in which inorganic fine particles are dispersed, is 0.5 μm or more, and more preferably is 1.0 μm or more. If the above-described cured film is too thin, an adequate wear-resistant effect cannot be achieved.

The ultraviolet-cured resin film, in which inorganic fine particles are dispersed, is formed by applying an ultraviolet curing resin, in which inorganic fine particles are dispersed, or a solution thereof on the laser beam incident-side surface of the translucent base 21 and curing it by ultraviolet irradiation after heat-drying is performed, if necessary. Examples of inorganic fine particles include silica, alumina, zirconia, titania, Sn-doped indium oxide (ITO), and Sb-doped tin oxide (ATO). Among the inorganic fine particles, reactive silica particles described in, for example, Japanese Unexamined Patent Application Publication No. 9-100111 are suitable for use in the present invention, where the reactive silica particles are particles in which fine particle surfaces are modified by compounds having active energy ray polymerizable groups and which are fixed in a resin matrix after the reaction. The abrasion resistance on the hard coat layer can be further enhanced by adding the above-described inorganic particles in a hard coat agent composition. The content of the inorganic particles is, for example, about 5 to 80 percent by weight in the hard coat agent composition (as a solid content in the case where a non-reactive diluent is contained). If the content of the inorganic particles exceeds 80 percent by weight, the brittleness of the hard coat layer tends to be deteriorated.

Preferably, the translucent base 21 is composed of a thermoplastic resin, e.g., polycarbonate or polymethylmethacrylate (PMMA), or an active energy ray curable resin, e.g., acrylic ultraviolet curing resin.

The ultraviolet curing resin film containing dispersed inorganic particles can realize alone a film having extremely high wear resistance. However, another layer may be disposed on the cured film surface, if necessary. Preferably, another layer is a functional layer having at least one function selected from the group consisting of the lubricity, the antistatic property, the antireflection property, the water repellency, and the oil repellency.

The present invention will be described below with reference to the examples.

TEST EXAMPLES 1 AND 2

(Medium Sample 1)

A DVD-ROM (commercial item) in which no hard coat layer was included and polycarbonate was adopted as a translucent base was used as Medium sample 1 to be tested, and an evaluation test of the abrasion resistance thereof was conducted as described below.

The Medium sample 1 was placed on an optical recording medium evaluation device, and the PI error value was measured with the optical recording medium device (DDU1000 produced by Pulstec Industrial Co., Ltd.) and a decoder produced by Kenwood Corporation on the condition of laser wavelength: 650 nm, laser power: 1.0 mW, numerical aperture NA of object lens: 0.60, and linear velocity: 3.5 m/s.

Subsequently, this Medium sample 1 to be tested was set on a Taber abrader and a laser beam incident-side surface of the Medium sample was abraded by using abrasive wheels CS-10F on the two different conditions, with a load of 2.5 N and with a load of 4.9 N. Suction of abrasion powder was not conducted when the load was 2.5 N, and the suction was conducted only when the load was 4.9 N. The relationship between the number of abrasion (the number of revolutions of a turntable) and the measurement result of the PI error value (count/8 ECC) at each of the numbers of abrasion is shown in the following Table 1 and FIG. 2.

TABLE 1

| The number of abrasion (time) | Test example 1 4.9N (with suction) | Test example 2 2.5N (without suction) |
| --- | --- | --- |
| 0 | 0 | 0 |
| 2 | 282 | 151 |
| 4 | 409 | 247 |
| 6 | — | 295 |
| 8 | — | 350 |
| 10 | — | 375 |
| | | (PI error value) |

Figure 2:
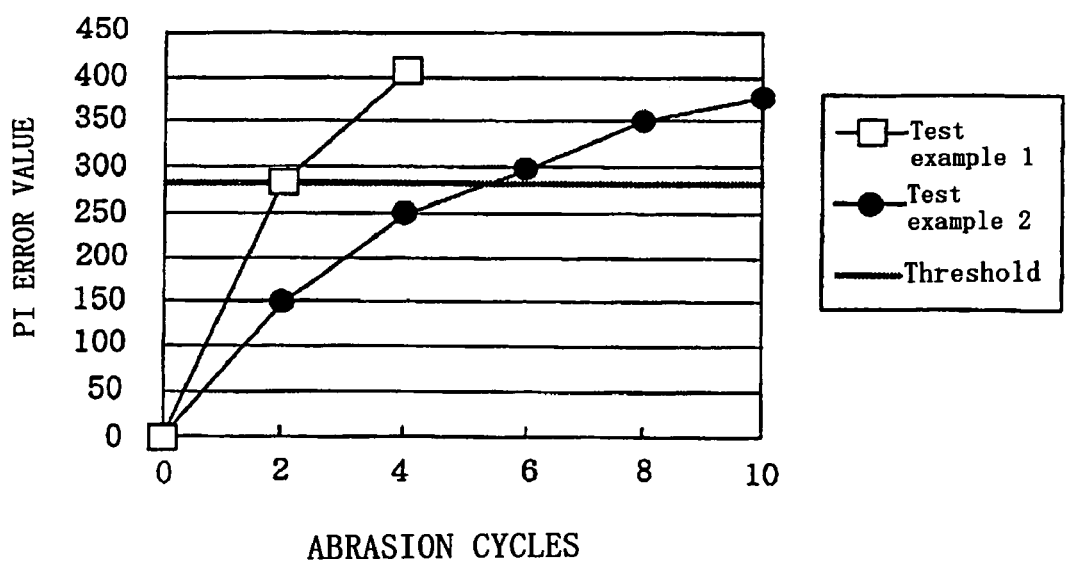
FIG. 2 is a graph representing the relationship between the number of abrasion cycles and the PI error value of a DVD-ROM.

As is clear from the above-described Table 1 and FIG. 2, the number of abrasion required until the threshold value is exceeded in Test example 2 is larger than that in Test example 1 and, therefore, Test example 2 shows a better result on the quantitative evaluation of the abrasion resistance on the laser beam incident-side surface of the high-recording-density optical information medium.

TEST EXAMPLES 3 TO 8

Medium samples 2 to 4 having the structure shown in FIG. 1 were prepared in a procedure as described below.

(Medium Sample 2)

The reflection layer 5 made of $Al_{98}Pd_1Cu_1$ (atomic ratio) having a thickness of 100 nm was formed by a sputtering method on the surface of the support base 20 (made of polycarbonate, diameter 120 mm, and thickness 1.1 mm) provided with a groove. The depth of the above-described groove was set at $\lambda/6$ in terms of an optical path length at a wavelength $\lambda=405$ nm. The recording track pitch in the groove recording system was set at 0.32 µm.

The second dielectric layer 32 of 20 nm in thickness was formed on the surface of the reflection layer 5 by the sputtering method through the use of an $Al_2O_3$ target. The recording layer 4 of 12 nm in thickness was formed on the surface of the second dielectric layer 32 by the sputtering method through the use of an alloy target made of a phase change material. The composition (atomic ratio) of the recording layer 4 was specified to be $Sb_{74}Te_{18}(Ge_7In_1)$. The first dielectric layer 31 of 130 nm in thickness was formed on the surface of the recording layer 4 by the sputtering method through the use of a ZnS (80 percent by mole)—$SiO_2$ (20 percent by mole) target.

Subsequently, a radical polymerizable ultraviolet curing resin having the following composition was applied by a spin coating method to the surface of the first dielectric layer 31, and an ultraviolet ray was applied, so that the translucent base 21 was formed in such a way that the thickness after curing became 98 µm. Composition of translucent base: ultraviolet curing resin

| | |
| --- | --- |
| urethane acrylate oligomer (DIABEAM UK6035 produced by MITSUBISHI RAYON CO., LTD.) isocyanuric acid EO-modified triacrylate | 50 parts by weight<br>10 parts by weight |
| (ARONIX M315 produced by TOAGOSEI Co., Ltd.) isocyanuric acid EO-modified diacrylate | 5 parts by weight |
| (ARONIX M215 produced by TOAGOSEI Co., Ltd.) tetrahydrofurfuryl acrylate | 25 parts by weight |
| photopolymerization initiator (1-hydroxycyclohexylphenyl ketone) | 3 parts by weight |

Furthermore, an ultraviolet curing hard coat agent having the following composition was applied by a spin coating method to the translucent base 21, so that a coating was formed. A diluent in the coating was removed by heating in the air at 60° C. for 3 minutes. Thereafter, an ultraviolet ray was applied, so that the hard coat layer 22 of 2 µm in thickness was formed.

Composition of hard coat agent

| | |
| --- | --- |
| reactive group modified colloidal silica (dispersion medium: propylene glycol monomethyl ether acetate, nonvolatile content: 40 percent by weight) | 100 parts by weight |
| dipentaerythritol hexaacrylate | 48 parts by weight |
| tetrahydrofurfuryl acrylate | 12 parts by weight |
| propylene glycol monomethyl ether acetate (non-reactive diluent) | 40 parts by weight |
| Irgacure 184 (polymerization initiator) | 5 parts by weight |

(Medium Sample 3)

The reflection layer 5 made of $Al_{98}Pd_1Cu_1$ (atomic ratio) was formed by a sputtering method on the surface of the support base 20 (made of polycarbonate, diameter 120 mm, and thickness 1.2 mm) provided with a groove. The depth of the above-described groove was set at $\lambda/6$ in terms of an optical path length at a wavelength λ=405 nm. The recording track pitch in the groove recording system was set at 0.32 μm.

The second dielectric layer 32 of 20 nm in thickness was formed on the surface of the reflection layer 5 by the sputtering method through the use of an $Al_2O_3$ target. The recording layer 4 of 12 nm in thickness was formed on the surface of the second dielectric layer 32 by the sputtering method through the use of an alloy target made of a phase change material. The composition (atomic ratio) of the recording layer 4 was specified to be $Sb_{74}Te_{18}(Ge_7In_1)$. The first dielectric layer 31 of 130 nm in thickness was formed on the surface of the recording layer 4 by the sputtering method through the use of a ZnS (80 percent by mole)—$SiO_2$ (20 percent by mole) target.

Subsequently, a radical polymerizable ultraviolet curing resin (SK5110 produced by Sony Chemicals Corporation) was applied by a spin coating method to the surface of the first dielectric layer 31, so that a resin layer was formed.

A polycarbonate sheet (thickness 100 μm) was placed on the resin layer in a vacuum (0.1 atmospheres (10 kPa) or less). PUREACE produced by Teijin Limited through a flow casting method was used as the above-described polycarbonate sheet. The atmosphere was returned to the air, and an ultraviolet ray was applied to cure the above-described resin layer, so that the translucent base 21 was formed.

(Medium Sample 4)

An ultraviolet curing resin (SD318 produced by DAINIPPON INK AND CHEMICALS, INCORPORATED) in place of the hard coat agent of Medium sample 2 was applied by a spin coating method in such a way that the film thickness after curing became 2.5 μm, followed by curing, so that the hard coat layer was formed. The other steps were similar to those in Medium sample 2.

The recording layer of each of Medium samples 2 to 4 was initialized (crystallized) by a bulk eraser. Thereafter, the sample was placed on an optical recording medium evaluation device, and a (1,7)RLL modulation signal was recorded in a region having a radius of 37 to 38 mm on the condition of laser wavelength: 405 nm, laser power: 5.0 mW, numerical aperture NA of object lens: 0.85, and linear velocity: 5.3 m/s. The recorded signal was reproduced at a laser power of 0.4 mW, and a bit error rate (bER) was measured.

Three portions were arbitrarily selected from the region having a radius of 37 to 38 mm of the disk, and the bER was measured as a signal error rate when a signal sequence substantially corresponding to a lap (42 msec) was read. An average value of bERs of the above-described three portions was taken as the measurement result. The optical disk evaluation device (DDU1000 produced by Pulstec Industrial Co., Ltd.) was used for the measurement.

Subsequently, each of the above-described Medium samples was set on a Taber abrader. A laser beam incident-side surface of each sample was abraded by using abrasive wheels CS-10F on the two different conditions, with a load of 2.5 N and with a load of 4.9 N. Suction of abrasion powder was not conducted when the load was 2.5 N, and the suction was conducted only when the load was 4.9 N. The relationship between the number of abrasion (the number of revolutions of a turntable) and the measurement result of the bit error rate value (bER) at each of the numbers of abrasion is shown in Table 2 and FIG. 3. The value in Table 2 and FIG. 3 indicates a value derived from multiplying the bit error rate (bER) by $10^7$ (seventh power of 10). As for the notational convention, "1.0E+01" represents 10. When a code on the right of E is "+", 10 is indicated, and when a code on the right of E is "−", one-tenth (1/10) is indicated. That is, "1.0E+02" represents 100, and "1.0E−02" represents one-hundredth (1/100).

TABLE 2

| The number of abrasion (time) | Test example 3 Medium sample 2 2.5N (without suction) | Test example 4 Medium sample 2 4.9N (with suction) | Test example 5 Medium sample 3 2.5N (without suction) | Test example 6 Medium sample 3 4.9N (with suction) | Test example 7 Medium sample 4 2.5N (without suction) | Test example 8 Medium sample 4 4.9N (with suction) |
|---|---|---|---|---|---|---|
| 0 | 1 | 1 | 1 | 1 | 1 | 1 |
| 2 | — | — | $5.67 \times 10^4$ | $1.8 \times 10^4$ | — | — |
| 4 | — | — | $1.27 \times 10^5$ | $2.5 \times 10^5$ | — | — |
| 6 | 1.33 | 15.3 | $2.47 \times 10^5$ | $3.45 \times 10^5$ | 31.3 | 90 |
| 10 | 18 | 243 | — | — | 50.7 | $3.06 \times 10^3$ |

(bER × 1.0E+07value)

Figure 3:
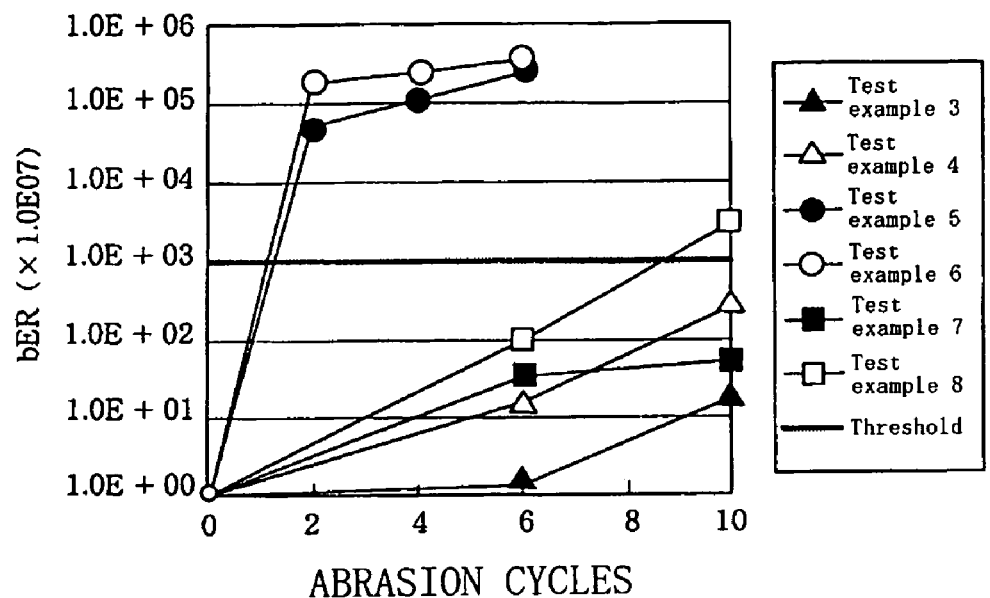
FIG. 3 is a graph representing the relationship between the number of abrasion cycles and the bit error rate in Test examples 3 to 8.

As is clear from the above-described Table 2 and FIG. 3, the number of abrasion required until the threshold value is exceeded in Test examples 3, 4, 7, and 8 are larger than those in Test examples 5 and 6. Therefore, Test examples 3, 4, 7, and 8 show better results in the quantitative evaluation of the abrasion resistance on the laser beam incident-side surface of the high-recording-density optical information medium.

TEST EXAMPLE 9 TO 11

Figure 4:
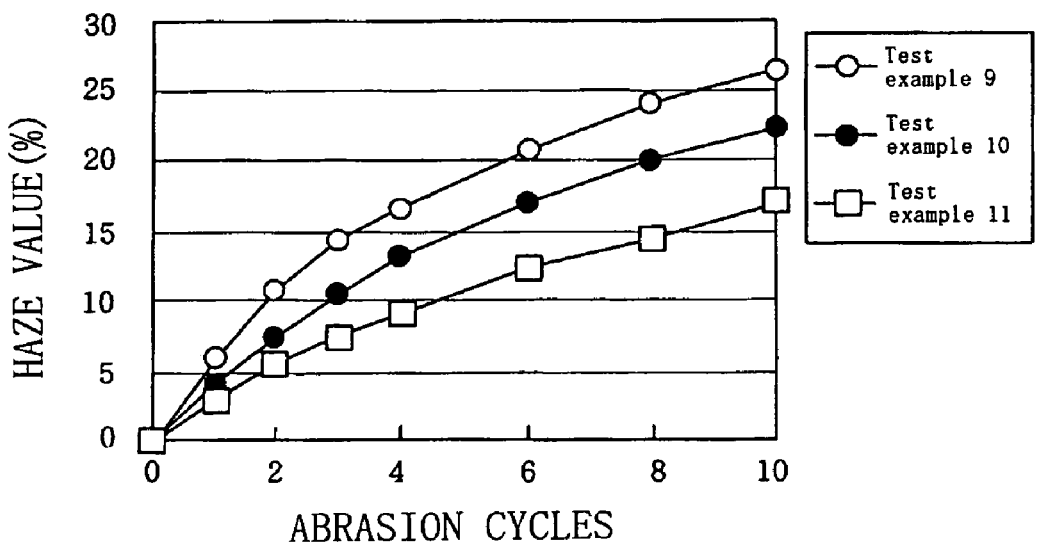
FIG. 4 is a graph representing the relationship between the number of abrasion cycles and the haze value (%) in Test examples 9 to 11.

The difference in abrasion speed based on whether abrasion powder was suctioned through the abrasion powder suction nozzle or not was examined in such a way that Medium sample 2 was used, white parallel light was allowed to incident thereon, and the haze value thereof was measured. Medium sample 2 was set on a Taber abrader. A laser beam incident-side surface of the sample was abraded by using abrasive wheels CS-10F on the different three conditions, with a load of 2.5 N (in the case where abrasion powder was suctioned and in the case where abrasion powder was not suctioned) and with a load of 4.9 N (in the case where abrasion powder was suctioned). The relationship between the number of abrasion (the number of revolutions of a turntable) and the haze value (%) at each of the numbers of abrasion is shown in FIG. 4. As is clear from this FIG. 4, the abrasion speed can be favorably reduced when suction through the abrasion powder suction nozzle is not performed.

INDUSTRIAL APPLICABILITY

As described above, according to the testing method of the present invention, even a high-recording-density optical information medium is more sensitive to flaw and stain on the translucent base surface than ever before, the abrasion resistance on the recording/reproducing light incident-side surface thereof can be quantified simply and in a form of reflecting an actual application environment.

The invention claimed is:

1. A method of testing an optical information medium, the method conducting an evaluation test in terms of abrasion resistance on a laser beam incident-side surface of the optical information medium which includes at least a support base, an information recording layer, and a translucent base in that order, to and/or from which recording and/or reproducing is made optically by a laser beam incident on the information recording layer from the translucent base side, and which has a focused radius R of a recording/reproducing laser beam of 40 μm or more and 400 μm or less on the translucent base surface, the focused radius R defined by the following expression (1):

$$R = 2T \tan [\sin^{-1}(NA/n)] \quad (1)$$

(in the expression, T is the thickness (μm) of the translucent base of the optical information medium, NA is the numerical aperture of an object lens in the recording/reproducing device of the optical information medium, and n is the refractive index of the translucent base of the optical information medium), the method comprising:

evaluating the abrasion resistance of the laser beam incident-side surface based on an error amount of a reproduction signal after the laser beam incident-side surface has been abraded by abrasive wheels specified in ISO9352.

2. The method of testing the optical information medium according to claim 1, wherein a load of the abrasive wheels is specified to be 2.5 to 4.9 N.

3. The method of testing the optical information medium according to claim 1, further comprising:

abrading the laser beam incident-side surface using the abrasive wheels specified in ISO9352.

4. The method of testing the optical information medium according to claim 1, wherein the evaluating comprises evaluating the abrasion resistance of the laser beam incident-side surface based on a bit error rate of the reproduction signal.

5. The method of testing the optical information medium according to claim 4, wherein the evaluating comprises measuring a number of abrasions by the abrasive wheels until the bit error rate reaches $1 \times 10^{-4}$.

6. The method of testing the optical information medium according to claim 1, wherein the evaluating comprises evaluating the abrasion resistance of the laser beam incident-side surface based on the error amount of the reproduction signal after each of a plurality of abrasions of the laser beam incident-side surface.

7. A method of testing abrasion resistance of an optical information medium including a support base, an information layer, and a translucent base, the method comprising:

abrading a laser beam incident-side surface of the optical information medium;

reproducing data stored on the information layer by a laser beam incident on the information layer from the translucent base side, after the abrading;

generating a reproduction signal based on the reproduced data; and evaluating the abrasion resistance of the laser beam incident-side surface based on an error amount of the generated reproduction signal.

8. The method of testing abrasion resistance of the optical information medium according to claim 7, wherein the evaluating comprises evaluating the abrasion resistance of the laser beam incident-side surface based on a bit error rate of the reproduction signal.

9. The method of testing abrasion resistance of the optical medium according to claim 7, wherein the evaluating comprises evaluating the abrasion resistance of the laser beam incident-side surface based on the error amount of the reproduction signal after each of a plurality of abrasions of the laser beam incident-side surface.

* * * * *